United States Patent
Masuda et al.

(10) Patent No.: US 9,381,913 B2
(45) Date of Patent: Jul. 5, 2016

(54) SYSTEM FOR COOLING VEHICLE-MOUNTED POWER CONTROL DEVICE AND METHOD FOR DIAGNOSING ABNORMALITY

(71) Applicant: HINO MOTORS, LTD., Tokyo (JP)

(72) Inventors: Manabu Masuda, Hino (JP); Takayuki Suruga, Hino (JP); Shin Mizoroki, Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 14/433,832

(22) PCT Filed: Oct. 8, 2013

(86) PCT No.: PCT/JP2013/077292
§ 371 (c)(1),
(2) Date: Apr. 6, 2015

(87) PCT Pub. No.: WO2014/057917
PCT Pub. Date: Apr. 17, 2014

(65) Prior Publication Data
US 2015/0232087 A1    Aug. 20, 2015

(30) Foreign Application Priority Data

Oct. 12, 2012 (JP) ................................ 2012-226663

(51) Int. Cl.
*B60L 11/18* (2006.01)
*B60K 11/02* (2006.01)
(Continued)

(52) U.S. Cl.
CPC ............... *B60W 20/50* (2013.01); *B60K 11/02* (2013.01); *B60K 11/06* (2013.01); *B60L 3/0038* (2013.01); *B60L 11/1851* (2013.01); *Y10S 903/903* (2013.01)

(58) Field of Classification Search
CPC .. B60W 20/50; B60L 11/1851; B60L 3/0038; B60K 11/02; B60K 11/06; Y10S 903/903

USPC .......................................................... 701/22
See application file for complete search history.

(56) References Cited

U.S. PATENT DOCUMENTS

| 4,277,772 A | * | 7/1981 | Kastura | .................. | B60K 35/00 |
| | | | | | 340/459 |
| 4,497,240 A | * | 2/1985 | Nagatomo | ......... | B60H 1/00864 |
| | | | | | 136/291 |

(Continued)

FOREIGN PATENT DOCUMENTS

| JP | 07-312802 A | 11/1995 |
| JP | 11-252808 A | 9/1999 |

(Continued)

OTHER PUBLICATIONS

Machine translation JP 2011-207321 A, (Denso Corp) Oct. 20, 2011.*

(Continued)

*Primary Examiner* — Jerrah Edwards
*Assistant Examiner* — Frederick Brushaber
(74) *Attorney, Agent, or Firm* — Sheridan Ross P.C.

(57) ABSTRACT

A system for cooling a power control device of a hybrid vehicle includes a cooling device for cooling a power control device, an electronic control device for controlling the cooling device, and an intake temperature sensor. The electronic control device determine whether the vehicle is in a reference traveling state with an intake amount ensured to be greater than or equal to a reference intake amount. When determining that the vehicle is in the reference traveling state, the control device determines presence or absence of abnormality in the cooling device using an intake temperature detected by the intake temperature sensor. When determining that the vehicle is not in the reference traveling state, the control device refrains from determining presence or absence of abnormality in the cooling device.

3 Claims, 5 Drawing Sheets

(51) Int. Cl.
*B60K 11/06* (2006.01)
*B60L 3/00* (2006.01)
*B60W 20/00* (2016.01)

(56) References Cited

U.S. PATENT DOCUMENTS

| | | | | |
|---|---|---|---|---|
| 4,587,615 | A * | 5/1986 | Takahashi | F02D 41/222 123/479 |
| 5,019,799 | A * | 5/1991 | Oshiage | B60T 8/885 340/438 |
| 5,163,290 | A * | 11/1992 | Kinnear | F01N 3/2013 60/274 |
| 6,148,910 | A * | 11/2000 | Warner | B60H 1/00278 165/297 |
| 6,218,643 | B1 * | 4/2001 | Iwata | F01N 3/2013 219/202 |
| 6,377,880 | B1 * | 4/2002 | Kato | B60K 6/485 180/65.26 |
| 2002/0161495 | A1 | 10/2002 | Yamaki | G01M 15/05 701/33.8 |
| 2003/0106883 | A1 * | 6/2003 | Sangwan | H05B 3/84 219/203 |
| 2009/0246606 | A1 * | 10/2009 | Shimizu | H01M 10/625 429/62 |
| 2011/0148426 | A1 * | 6/2011 | Yokotani | G01R 19/16542 324/434 |
| 2012/0160447 | A1 * | 6/2012 | Kinomura | B60H 1/025 165/51 |
| 2012/0323427 | A1 | 12/2012 | Endo et al. | |
| 2013/0334193 | A1 * | 12/2013 | Nagami | H05B 1/0202 219/202 |
| 2014/0110081 | A1 * | 4/2014 | Porras | F01P 11/04 165/11.1 |
| 2014/0158784 | A1 * | 6/2014 | Lundberg | F01P 7/14 237/5 |

FOREIGN PATENT DOCUMENTS

| | | |
|---|---|---|
| JP | 2000-220456 A | 8/2000 |
| JP | 2005-223535 A | 8/2005 |
| JP | 2009-133261 A | 6/2009 |
| JP | 2010-116994 A | 5/2010 |
| JP | 2010-220374 A | 9/2010 |
| JP | 2011-207321 A | 10/2011 |
| WO | WO2011/012171 A | 10/2011 |

OTHER PUBLICATIONS

Machine translation JP 2009-133261 A, (Denso Corp) Jun. 18, 2009.*

International Preliminary Report on Patentability and Written Opinion (with English translation) for International Application No. PCT/JP2013/077292, mailed Apr. 14, 2015, 5 pages.

International Search Report prepared by the Japanese Patent Office on Dec. 27, 2013, for International Application No. PCT/JP2013/077292.

* cited by examiner

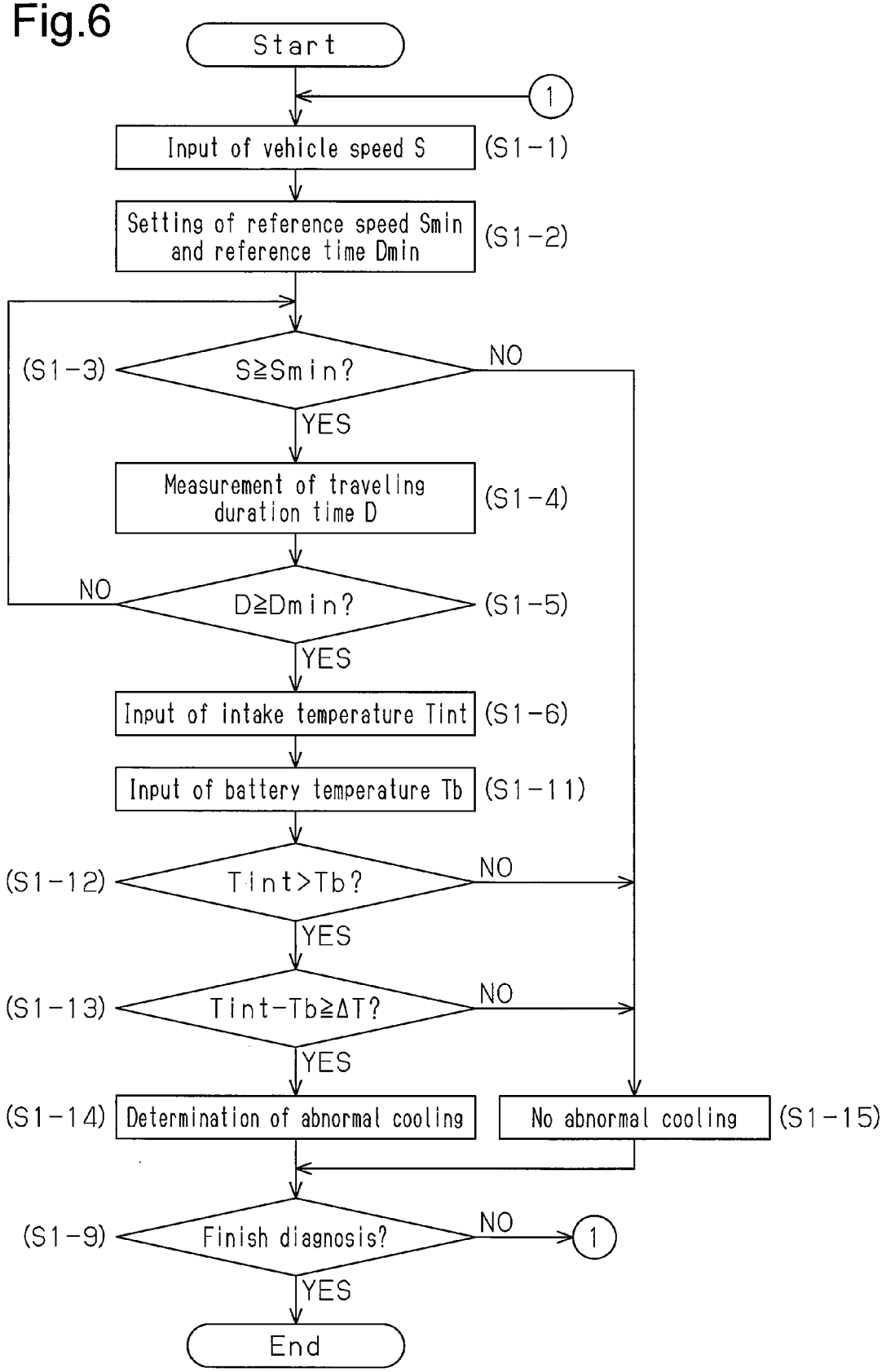

SYSTEM FOR COOLING VEHICLE-MOUNTED POWER CONTROL DEVICE AND METHOD FOR DIAGNOSING ABNORMALITY

CROSS REFERENCE TO RELATED APPLICATIONS

This application is a national stage application under 35 U.S.C. 371 and claims priority to and the benefit of PCT Application No. PCT/JP2013/077292 having an international filing date of Oct. 8, 2013, which designated the United States, which PCT application claimed priority to and the benefit of Japanese Patent Application No. 2012-226663 filed Oct. 12, 2012, the disclosures of each of which are incorporated herein by reference.

FIELD OF THE INVENTION

The techniques of the present disclosure relate to a system for cooling a power control device mounted on a hybrid vehicle and a method for diagnosing abnormality of the power control device.

BACKGROUND OF THE INVENTION

A hybrid vehicle has an engine and a rotating electrical machine as drive sources. A power control device mounted on the hybrid vehicle includes a battery module, which includes a plurality of battery cells, and an inverter, which converts direct-current power output by the battery module to alternating-current power. For example, the inverter includes a semiconductor element for high power to increase the output and thus generates a large amount of heat due to power loss. The characteristics of the battery module greatly change depending on the temperature. Thus, an independent cooling system is separately provided for the power control device.

One such system for cooling a power control device adopts both water-cooling and air-cooling types. A water-cooling type cooling device cools an inverter. The water-cooling type cooling device includes a circulation path through which liquid cooling medium circulates, a pump for circulating the cooling medium, and a radiator for cooling the cooling medium. The radiator includes an electric fan arranged at a lateral face of the radiator to accelerate radiation of heat. An air-cooling type cooling device cools a battery module. The cooling device includes a motor-driven fan for sending air between battery cells.

Abnormality diagnosis for the cooling system needs to not only detect overheated states of the inverter and the battery module but also diagnose whether abnormality occurs when the ambient temperature is low. For example, when having a temperature in a low temperature range, a water temperature sensor arranged in the circulation path outputs the same detection signal as when having a broken wire. Thus, it is difficult to detect that the water temperature sensor in the low temperature range has a broken wire. Since the characteristics of the battery module change depending on the temperature, it is necessary to detect a state in which the inner temperature is significantly lower than the ambient temperature as well as detecting an overheated state. Thus, when the inner temperature becomes significantly lower than the ambient temperature, the battery module likely has some abnormality, and it is preferable to promptly detect the abnormality.

Patent Document 1 discloses a method for detecting a broken wire of a temperature sensor provided for a rotating electrical machine by using an ambient temperature and the like, which are detected by an ambient temperature sensor, and torque applied to the rotating electrical machine.

PRIOR ART DOCUMENT

Patent Document

Patent Document 1: Japanese Laid-Open Patent Publication No. 2010-220374

SUMMARY OF THE INVENTION

When an ambient temperature sensor is provided for a cooling system, the number of components and the costs increase. Although it is preferable to effectively utilize an existing temperature sensor provided for the vehicle, heat discharged from the combustion chamber of the engine and other factors may affect some temperature sensors to decrease detection accuracy. Such problems are not limited to a cooling system configured as mentioned above, but also apply to most of systems for cooling a vehicle-mounted power control device.

An objective of the present disclosure is to provide a system for cooling a vehicle-mounted power control device and a method for diagnosing abnormality that improve accuracy of abnormality diagnosis according to an ambient temperature without increasing the number of components.

A system according to one aspect of the present disclosure is a system for cooling a power control device of a hybrid vehicle including an engine and a rotating electrical machine. The system comprises a cooling device for cooling the power control device, an electronic control device for controlling the cooling device, and an intake temperature sensor that is arranged in an intake passage of the engine and detects an intake temperature. The electronic control device is configured to determine whether the vehicle is in a reference traveling state in which an intake amount to the engine is ensured to be greater than or equal to a reference intake amount. When determining that the vehicle is in the reference traveling state, the electronic control device is configured to determine presence or absence of abnormality in the cooling device by using an intake temperature detected by the intake temperature sensor. When determining that the vehicle is not in the reference traveling state, the electronic control device is configured to refrain from determining presence or absence of abnormality in the cooling device.

According to this aspect, the intake temperature detected by the intake temperature sensor is used to detect whether the ambient temperature is in a low temperature range or a high temperature range. Thus, the ambient temperature can be detected by effectively utilizing the intake temperature sensor without separately providing an ambient temperature sensor for abnormality diagnosis. Furthermore, the timing of using the output value of the intake temperature sensor is limited to when the reference intake amount is ensured, which is when influence of heat from the engine is eliminated so that the intake temperature becomes substantially equal to the ambient temperature. Accordingly, accurate detection of the ambient temperature reduces the possibility of falsely determining abnormality of the cooling device.

Preferably, the vehicle is adapted to travel in a traveling mode selected from a plurality of traveling modes. According to the traveling mode, the electronic control device is configured to set a reference speed and a reference traveling duration time that allow the reference intake amount to be ensured. The electronic control device is configured to determine that the vehicle is in the reference traveling state when a state in which a speed of the vehicle is greater than or equal to the reference speed has continued for time longer than or equal to the reference traveling duration time.

According to this aspect, when the state in which the vehicle speed is greater than or equal to the reference value has continued for time longer than or equal to the reference traveling duration time, it is determined that the hybrid vehicle is in the reference traveling state, and the intake temperature is used for abnormality diagnosis. When the intake temperature is used at this timing, the reference intake amount is ensured so that the intake air absorbs most of heat accumulated in the intake passage of the engine, and the input intake temperature is substantially the same as the actual ambient temperature. Furthermore, since the reference speed and the reference time are set according to the traveling mode of the hybrid vehicle, the intake temperature is input at the timing at which the reference intake amount is ensured in each traveling mode.

Preferably, the power control device includes an inverter connected to the rotating electrical machine and a battery connected to the inverter. The cooling device includes a cooling medium circulation flow path through which a cooling medium for cooling at least the inverter circulates, a radiator for cooling the cooling medium, and a cooling medium temperature detection section that is arranged in the cooling medium circulation flow path and has resistance increasing as a temperature decreases. The electronic control device is configured to determine whether the vehicle is in the reference traveling state. When determining that the vehicle is in the reference traveling state, the electronic control device is configured to determine whether an ambient temperature is in a low temperature range by using the intake temperature detected by the intake temperature sensor. The electronic control device is configured to determine whether an output value of the cooling medium temperature detection section is in an output range for a broken wire, which is a range of values output from the cooling medium temperature detection section when the cooling medium temperature detection section has a broken wire. When the ambient temperature is not in the low temperature range and the output value of the cooling medium temperature detection section is in the output range for a broken wire, the electronic control device is configured to determine that the cooling medium temperature detection section has a broken wire. At least when the ambient temperature is in the low temperature range, the electronic control device is configured to refrain from determining presence or absence of a broken wire.

According to this aspect, the electronic control device refrains from determining presence or absence of a broken wire in the cooling medium temperature detection section, which has resistance increasing as the temperature decreases, when the ambient temperature is in the low temperature range. When the ambient temperature is not in the low temperature range and the cooling medium temperature detection section outputs a value in the output range for a broken wire, the electronic control device determines that a wire is broken. This reduces the possibility of falsely determining that a wire is broken although no wire is broken only based on a value output when a temperature is low. Furthermore, it is avoidable to falsely determine that the ambient temperature is not in the low temperature range when actually it is by using the intake temperature detected in the reference traveling state. This reduces the possibility of falsely determining that a wire is broken although no wire is broken.

Preferably, the electronic control device includes an inverter connected to the rotating electrical machine and a battery connected to the inverter. The cooling device includes an electric fan that sends air into the battery to cool the battery and a battery temperature detection section for detecting an inner temperature of the battery. The electronic control device is configured to determine whether the vehicle is in the reference traveling state. When determining that the vehicle is in the reference traveling state, the electronic control device is configured to receive input of the intake temperature detected by the intake temperature sensor. The electronic control device is configured to determine that the battery is abnormally cooled if a detected battery temperature value input by the battery temperature detection section is less as compared to the received intake temperature and a difference between the intake temperature and the detected battery temperature value is greater than or equal to a threshold.

According to this aspect, the electronic control device determines that the battery is abnormally cooled if the detected battery temperature value input by the battery temperature detection section is less than the intake temperature input by the intake temperature sensor and the difference between the intake temperature and the detected battery temperature value is greater than or equal to the threshold. Thus, it is possible to detect a state of the battery, e.g., a state in which the battery is frozen. Furthermore, the electronic control device is configured to use the intake temperature detected when the vehicle is in the reference traveling state. Accordingly, it is avoidable to falsely determine that the ambient temperature is not in the low temperature range when actually it is. This reduces the possibility of falsely determining that the battery is abnormally cooled simply due to a low surrounding temperature of the battery.

A method according to one aspect of the present disclosure is a method for diagnosing abnormality of a cooling device for cooling a power control device of a hybrid vehicle including an engine and a rotating electrical machine. In the method, the vehicle includes an intake temperature sensor that is arranged in an intake passage of the engine and detects an intake temperature. The method comprises determining whether the vehicle is in a reference traveling state in which an intake amount to the engine is ensured to be greater than or equal to a reference intake amount, refraining from determining presence or absence of abnormality in the cooling device when it is determined that the vehicle is not in the reference traveling state, and determining presence or absence of abnormality in the cooling device using an intake temperature detected by the intake temperature sensor as an ambient temperature when it is determined that the vehicle is in the reference traveling state.

According to this aspect, the intake temperature detected by the intake temperature sensor is used to determine whether the ambient temperature is in the low temperature range or in the high temperature range. Thus, the intake temperature sensor is effectively utilized to detect a temperature substantially the same as the ambient temperature without separately providing an ambient temperature sensor for abnormality diagnosis. Furthermore, the timing of using the output value of the intake temperature sensor is limited to when the intake amount is ensured to be greater than or equal to the reference intake amount. With the timing, the ensured reference intake amount eliminates influence of heat from the engine so that the intake temperature is substantially equal to the ambient temperature. Accordingly, accurate detection of the ambient temperature reduces the possibility of falsely determining abnormality of the cooling device.

BRIEF DESCRIPTION OF THE DRAWINGS

FIG. 6 is a flowchart showing another control procedure according to a second embodiment in the method for diagnosing abnormality in the cooling system of FIG. 1.

DETAILED DESCRIPTION OF THE PREFERRED EMBODIMENTS

First Embodiment

A system for cooling a vehicle-mounted power control device and a method for diagnosing abnormality of the power control device according to a first embodiment will now be described with reference to FIGS. 1 to 5.

Figure 1:
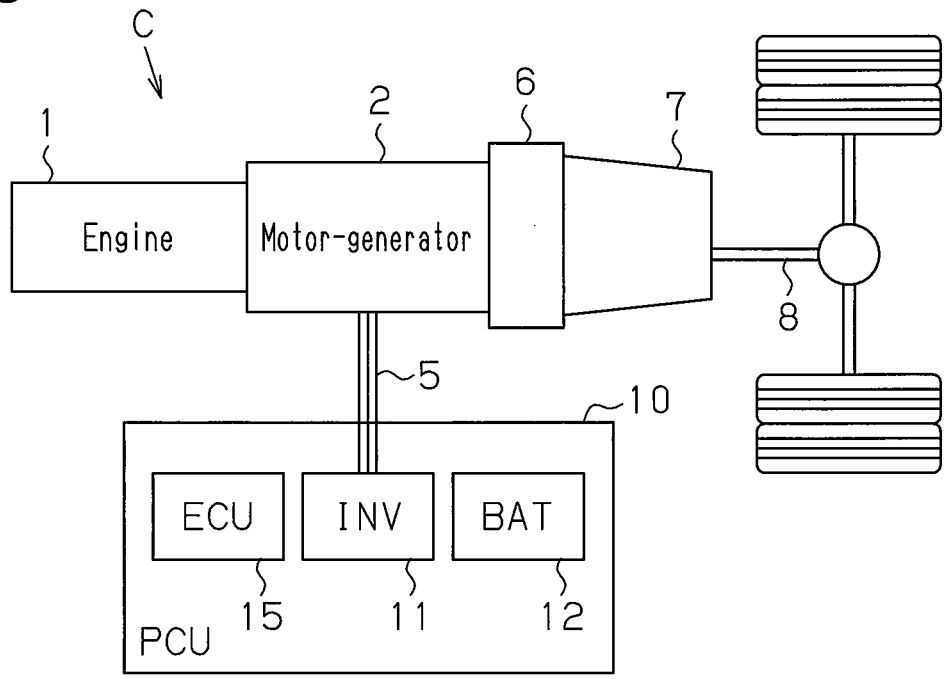
FIG. 1 is a block diagram of an example of a hybrid vehicle, on which a vehicle-mounted cooling system according to the present disclosure is mounted.

As shown in FIG. 1, a hybrid vehicle C includes an engine 1, a motor-generator 2, which functions as a rotating electrical machine, and a gear mechanism (not shown), which couples the engine 1 to the motor-generator 2. The motor-generator 2 is connected to a power control unit (PCU) 10 with a three-phase cable 5. The motor-generator 2 is also coupled to a transmission 7 via a clutch 6. The transmission 7 has an output shaft coupled to a drive shaft 8 of the vehicle.

The PCU 10 includes an inverter 11 for a hybrid vehicle, a battery module 12 including a plurality of cells, and an ECU 15, which functions as an electronic control system. The inverter 11 is connected to the motor-generator 2 with the three-phase cable 5. The battery module 12 is electrically connected to the motor-generator 2 via the inverter 11. The battery module 12 includes a rechargeable battery or a high capacity capacitor.

The inverter 11 includes a power semiconductor element and a cooling board that supports the element by sandwiching. After a boost convertor (not shown) boosts direct current of the battery module 12, the inverter 11 converts the direct current to three-phase alternating current, which is supplied to the motor-generator 2. The inverter 11 also converts three-phase alternating current generated by the motor-generator 2 to direct current, which is supplied to the battery module 12 to charge the battery module 12. The inverter 11 is controlled by the ECU 15, which is a component of the PCU 10.

When the vehicle starts moving or travels with a low load, for example, a traveling mode is selected to drive the motor-generator 2. In this case, the battery module 12 supplies direct current to the inverter 11. The inverter 11 converts the direct current to three-phase alternating current, which is supplied to the motor-generator 2. The motor-generator 2, which works as a motor, transmits a rotation force to the drive shaft 8 via the clutch 6 and the transmission 7. In this state, the inverter 11 and the battery module 12 release some of the electric energy as heat by being driven.

When the vehicle travels with a heavy load, for example, a parallel traveling mode is selected to drive the engine 1 and the motor-generator 2. When the remaining capacity of the battery module 12 becomes low, for example, a mode for driving only the engine 1 or a regeneration mode is selected. Also in these cases, the inverter 11 and the battery module 12 release some of the electric energy as heat by being driven.

Figure 2:
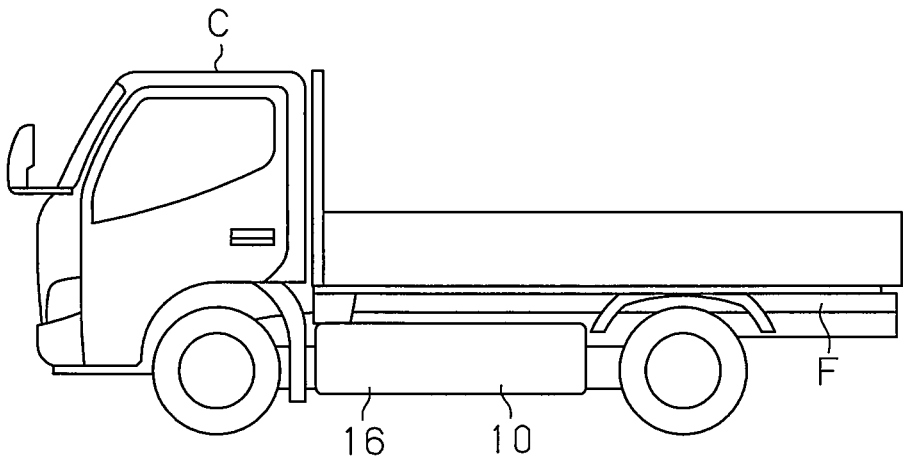
FIG. 2 is a side view of a vehicle showing a mounting position of the vehicle-mounted cooling system of FIG. 1.

The configuration of the cooling system of the PCU 10 will now be described. FIG. 2 shows a housing 16 of the PCU 10, which accommodates the inverter 11, the battery module 12, and the ECU 15. The housing 16 includes an intake port and an exhaust port (neither shown). The air drawn through the intake port passes through between the battery cells included in the battery module 12 to cool the battery cells, and is discharged through the exhaust port.

When the vehicle C is a truck, the housing 16 is attached to, e.g., a frame F. When rotating wheels splash water drops and ice chips, the water drops and ice chips are deposited on the housing 16 to easily freeze the housing 16. Furthermore, the water drops and ice chips may be drawn through the intake port of the housing 16 and deposited on the battery module 12 and other parts to freeze. This may decrease the inner temperature of the PCU 10 to a temperature lower than the ambient temperature to cause abnormal cooling.

The housing 16 also accommodates an air-cooling type cooling device 40 for cooling the battery module 12 and a water-cooling type cooling device 20 for cooling the inverter 11 and the ECU 15.

Figure 3:
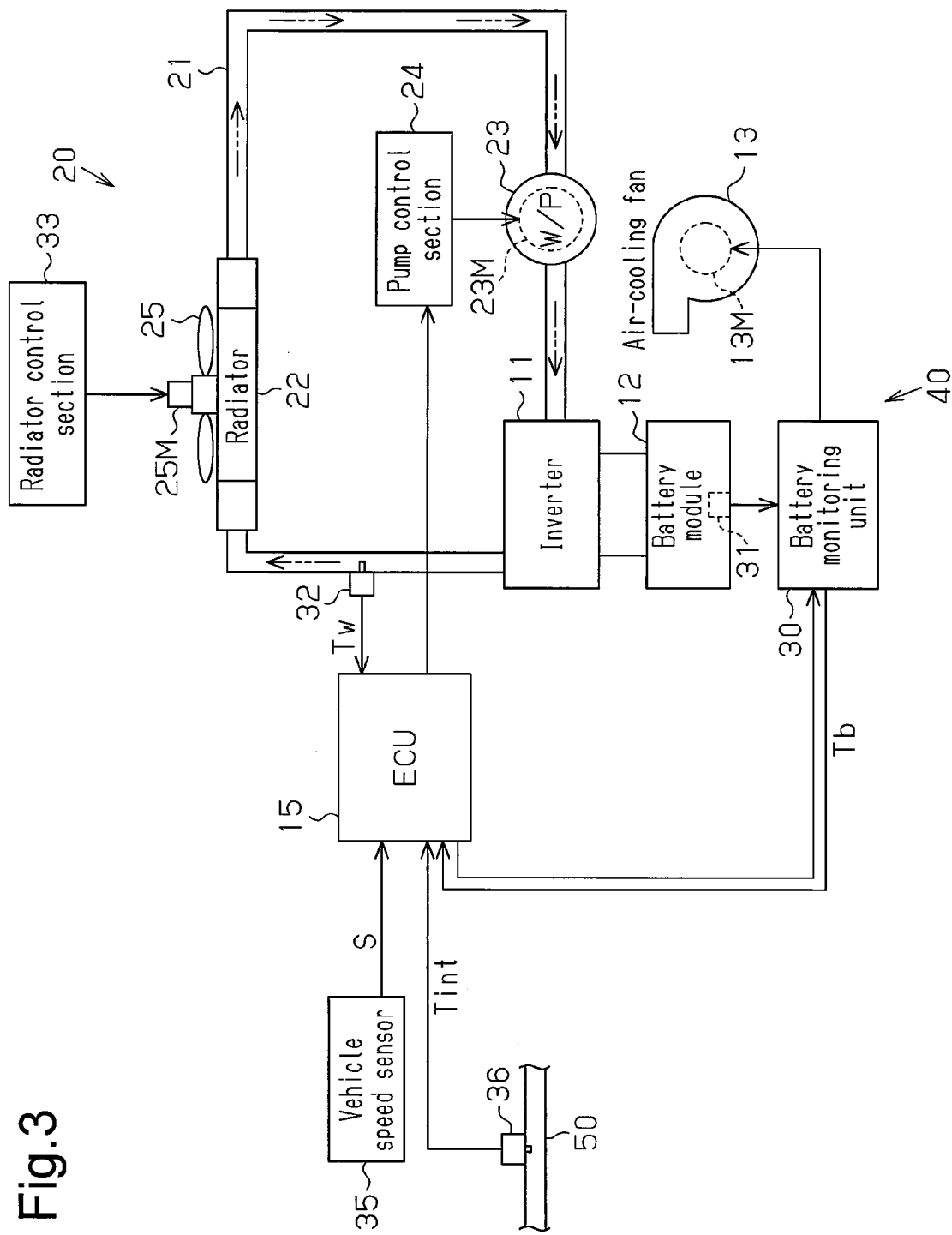
FIG. 3 is a block diagram showing the configuration of the cooling system of FIG. 1.

The air-cooling type cooling device 40 will first be described. As shown in FIG. 3, the air-cooling type cooling device 40 includes an electric fan 13 and a battery monitoring unit 30. The electric fan 13 is rotated by a drive motor 13M as a driving source to discharge air of the housing 16 through an exhaust port and draw ambient air into the housing 16.

The battery monitoring unit 30 monitors the state of the battery module 12, e.g., the remaining capacity of the battery cells. The battery module 12 includes a battery temperature sensor 31 for sensing the inner temperature of the battery module 12. The battery monitoring unit 30 receives input of a detection signal from the battery temperature sensor 31 and outputs the detected battery temperature value as a battery temperature Tb to the ECU 15.

With input of the battery temperature Tb, the ECU 15 determines whether the battery module 12 is maintained at a temperature in a proper temperature range. When the battery temperature Tb is a temperature at which the battery module 12 needs to be air-cooled, the ECU 15 drives the drive motor 13M of the electric fan 13 via the battery monitoring unit 30.

The water-cooling type cooling device 20 will now be described. As shown in FIG. 3, the cooling device 20 includes a circulation path 21 through which a liquid cooling medium circulates, a radiator 22 arranged in a portion of the circulation path 21, and a water pump 23.

The circulation path 21 communicates with a flow path arranged inside the cooling board of the inverter 11. The cooling medium passes through the flow path arranged in the cooling board to absorb heat released by the semiconductor element.

The water pump 23 is driven by a pump control section 24. When a drive motor 23M of the water pump 23 is driven, the cooling medium flows to the inverter 11 and the radiator 22 in this order and circulates through the circulation path 21.

A water temperature sensor 32 is also arranged in a portion of the circulation path 21. The water temperature sensor 32 comprises a thermistor. e.g., an NTC thermistor, of which the resistance increases as the surrounding temperature decreases. The water temperature sensor 32 outputs a voltage value to the ECU 15. The ECU 15, which stores a cooling medium temperature map that associates the voltage value output by the water temperature sensor 32 with the temperature of the cooling medium, calculates a cooling medium temperature based on the input voltage value and the map.

Figure 4:
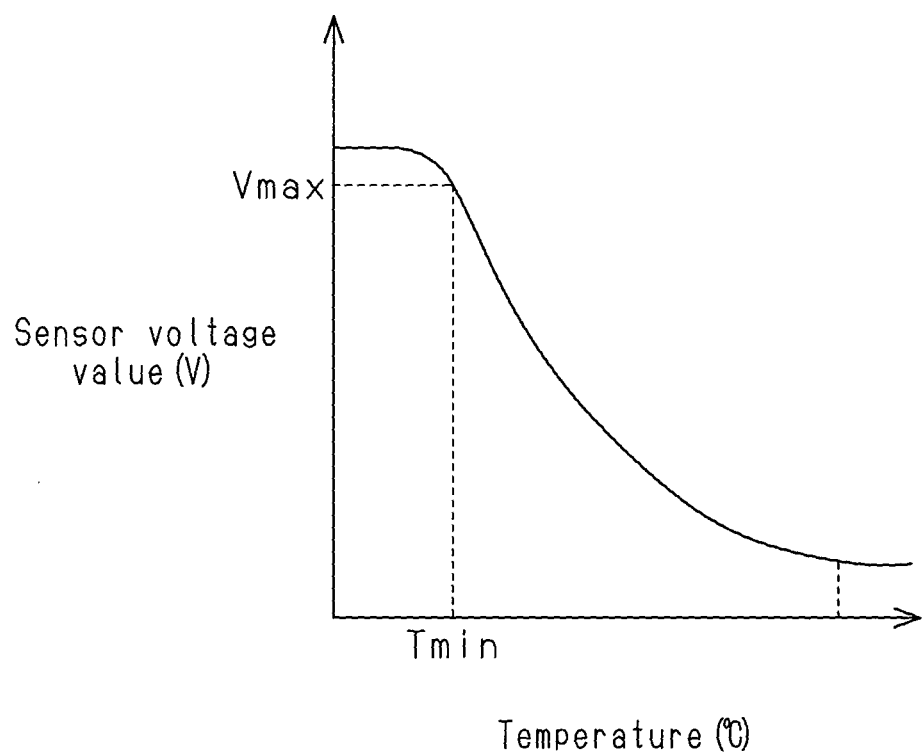
FIG. 4 is a schematic graph of a map used in a method for diagnosing abnormality in the cooling system of FIG. 1.

The cooling medium temperature map has a sensor voltage value associated with the temperature of the cooling medium that increases as the temperature of the cooling medium decreases as shown in FIG. 4. The cooling medium temperature map also has an upper limit voltage value Vmax as upper limit to maintain detection accuracy of the water temperature sensor 32. For example, at a low temperature around 30 degrees below zero, the water temperature sensor 32 outputs a voltage value that exceeds the upper limit voltage value Vmax set at, e.g. 4.8 V. The water temperature sensor 32 having a broken wire also outputs a voltage value that is substantially the same as a value output at a low temperature and exceeds the upper limit voltage value Vmax. Thus, it is difficult to distinguish between the water temperature sensor 32 having a broken wire and the surrounding of the PCU 10 simply having a low temperature, i.e., the low ambient temperature, only based on the fact that the water temperature sensor 32 outputs a voltage value that exceeds the upper limit voltage value Vmax.

The ECU 15 also obtains an instructing rotation speed of the water pump 23 from a cooling medium temperature and a pump rotation map (not shown) and drives the water pump 23 with the pump control section 24.

As shown in FIG. 3, an electric fan 25 is arranged at a lateral face of the radiator 22. The ECU 15 drives a drive motor 25M of the electric fan 25 at a prescribed rotation speed with the radiator control section 33 when the cooling medium temperature becomes greater than or equal to a predetermined temperature.

The ECU 15 obtains a vehicle speed S from a vehicle speed sensor 35 that detects the rotation speed of a wheel to determine whether the vehicle C is traveling. The ECU 15 receives input of the temperature of intake air flowing through the intake passage 50, i.e., the intake temperature Tint, from an intake temperature sensor 36 arranged in an intake passage 50 of the engine 1. The intake temperature sensor 36 includes a bypass path through which some of the intake air flowing through the intake passage 50 flows to a detection section. This structure reduces influence on the intake temperature sensor 36 of intake pulsation generated by an air cleaner (not shown).

The ECU 15 diagnoses abnormality of devices that are components of a cooling system of the PCU 10. A process of diagnosing abnormality of the water temperature sensor 32 will now be described.

When an ignition switch inputs a signal indicating an on-state, the ECU 15 drives the drive motor 23M of the water pump 23 with the pump control section 24. With input of the on-signal, the ECU 15 starts a process of abnormality diagnosis, which diagnoses presence or absence of a broken wire in the water temperature sensor 32.

Figure 5:
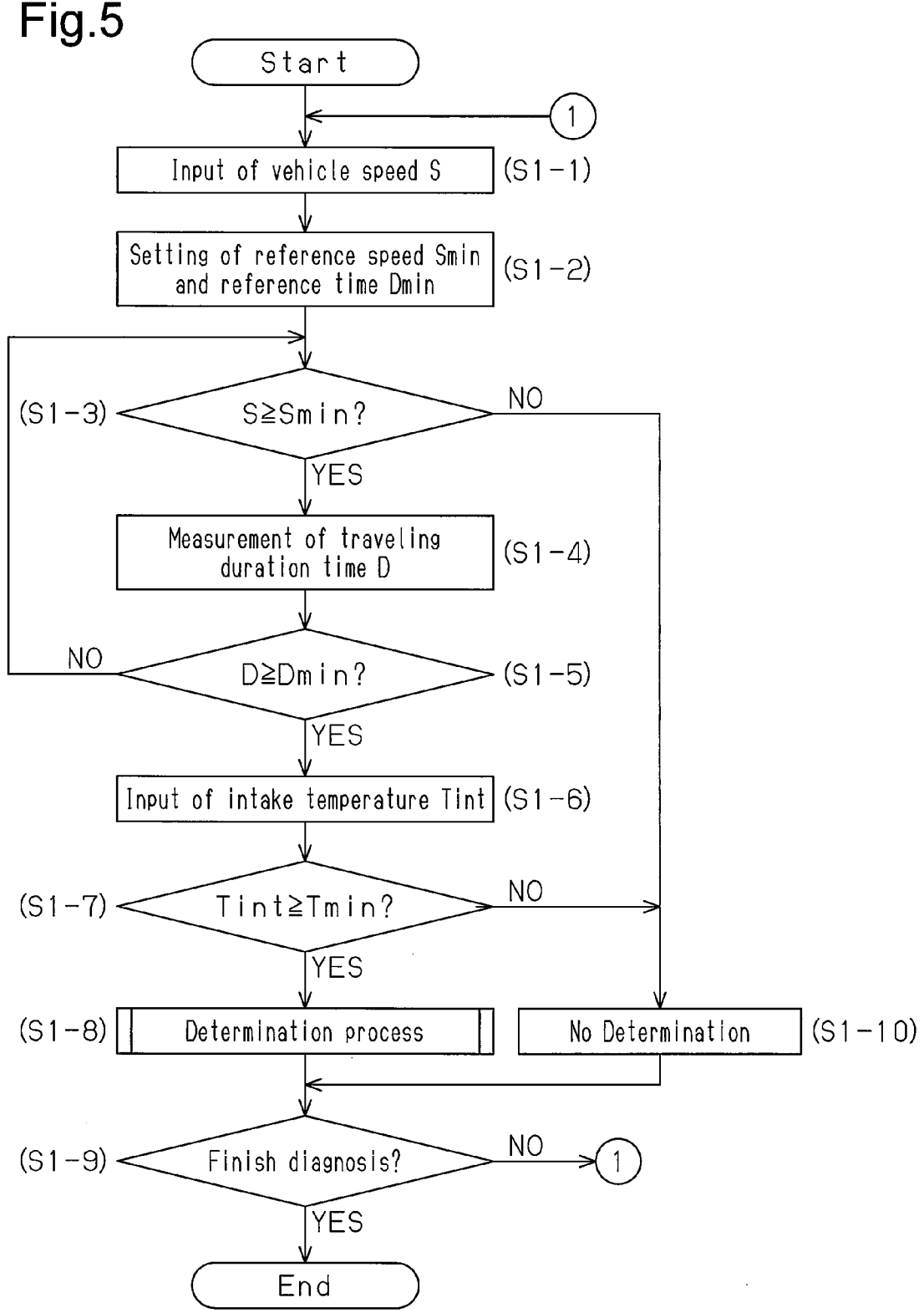
FIG. 5 is a flowchart showing a control procedure according to a first embodiment in the method for diagnosing abnormality in the cooling system of FIG. 1.

As shown in FIG. 5, when the process of abnormality diagnosis is started for the water temperature sensor 32, the ECU 15 receives input of the vehicle speed S from the vehicle speed sensor 35 (step S1-1) and sets a reference speed Smin and a reference time Dmin according to the traveling mode of the vehicle C at that moment (step S1-2). The reference speed Smin and the reference time Dmin are set such that the intake amount of the engine 1 becomes greater than or equal to a prescribed intake amount, i.e., a reference intake amount, in the corresponding traveling mode.

A traveling mode and timing for selecting the traveling mode vary depending on the type of a vehicle. In the traveling mode for driving only the motor-generator 2, for example, the reference speed Smin is set to a high speed (e.g., 200 km per hour) that is unreachable at the start of the engine 1, since the engine 1 stops and it is impossible to ensure the reference intake amount. In the parallel traveling mode, the traveling mode for driving only the engine 1, and the regeneration mode, which are described above, the ECU 15 has a memory section storing the reference speed Smin and the reference time Dmin, which are a vehicle speed and a traveling duration time obtained through experiments such that the reference intake amount is ensured when these modes are selected.

The ECU 15 determines whether the input vehicle speed S is greater than or equal to the reference speed Smin (step S1-3). When determining that the vehicle speed S is greater than or equal to the reference speed Smin (YES at step S1-3), the ECU 15 starts measuring time as a traveling duration time D for which the state has continued that the vehicle speed S is greater than or equal to the reference speed Smin (step S1-4). The ECU 15 determines whether the traveling duration time D, of which the measurement has been started, is greater than or equal to the prescribed reference time Dmin (step S1-S).

When determining that the traveling duration time D is less than the reference time Dmin (NO at step S1-5), the ECU 15 returns to step S1-3 and determines whether the vehicle speed S is greater than or equal to the reference speed Smin. When the state has continued that the vehicle speed S is greater than or equal to the reference speed Smin (YES at step S1-3), the ECU 15 moves to step S1-4 and updates the traveling duration time D. Thus, the traveling duration time D, for which the state has continued, is updated unless the vehicle speed S becomes below the reference speed Smin.

When the traveling duration time D becomes greater than or equal to the reference time Dmin (YES at step S1-5), the ECU 15 receives input of the intake temperature Tint detected by the intake temperature sensor 36 (step S1-6) and uses the intake temperature Tint as the ambient temperature. Immediately after the vehicle speed S reaches the reference speed Smin, some of the heat discharged from the combustion chamber of the engine 1 is not absorbed by intake air, and no small amount of the heat may be accumulated in the intake passage 50. When the traveling duration time D reaches the reference time Dmin, intake air absorbs most of the heat accumulated in the intake passage 50, so that the intake temperature Tint becomes substantially the same as the actual ambient temperature. There is another possible method for determining whether the intake air amount is ensured to be greater than or equal to a reference amount. The method uses the intake amount obtained from, e.g., an airflow meter, for the determination. However, this method is unfavorable because it is necessary to correct the intake amount obtained from the air flow meter according to the intake temperature Tint.

With input of the intake temperature Tint, the ECU 15 determines whether the intake temperature Tint is greater than or equal to a lower limit temperature Tmin of the water temperature sensor 32 (step S1-7). The lower limit temperature Tmin is the lowest temperature in a range of temperatures at which the water temperature sensor 32 maintains high accuracy. As shown in FIG. 4, the cooling medium temperature map has the lower limit temperature Tmin associated with the upper limit voltage value Vmax, and the lower limit temperature Tmin is, e.g., 25 degrees below zero.

At step S1-7, when determining that the intake temperature Tint is greater than or equal to the lower limit temperature Tmin (YES at step S1-7), the ECU 15 performs a determination process of determining presence or absence of a broken wire in the water temperature sensor 32 (step S1-8). For example, the ECU 15 determines whether the voltage value V output by the water temperature sensor 32 is greater than or equal to the upper limit voltage value Vmax. When the voltage value V is greater than or equal to the upper limit voltage value Vmax, the ECU 15 determines that the water temperature sensor 32 has a broken wire and outputs a code indicating presence of a broken wire to another ECU and the like. When the voltage value V is less than the upper limit voltage value Vmax, the ECU 15 determines that no wire is broken. After determining presence or absence of a broken wire, the ECU 15 moves to step S1-9.

When it is determined that the intake temperature Tint is less than the lower limit temperature Tmin at step S1-7 (NO at step S1-7), it is difficult to determine presence or absence of a broken wire in the water temperature sensor 32 from the voltage value of the water temperature sensor 32 since the ambient temperature is in the low temperature range. Thus, the ECU 15 moves to step S1-9 without performing the determination process (step S1-10).

At step S1-9, it is determined whether to finish the diagnosis. For example, the ECU 15 determines whether it has received an off-signal from the ignition switch. With input of the off-signal, the ECU 15 finishes the diagnosis (YES at step S1-9). When determining not to finish the diagnosis, the ECU 15 returns to step S1-1 and repeats the above process. In other words, the ECU 15 keeps updating the traveling duration time D as long as the vehicle speed S is greater than or equal to the reference speed Smin and compares the intake temperature Tint with the lower limit temperature Tmin.

When it is determined that the vehicle speed S is less than the traveling reference speed Smin at step S1-3 (NO at step S1-3), due to the insufficient intake amount, it is unlikely for intake air to sufficiently carry heat discharged from the combustion chamber of the engine 1 away from the surrounding of the intake temperature sensor 36. Thus, it is difficult to detect the temperature of the ambient air. In such a case, the ECU 15 skips the determination process of determining presence or absence of a broken wire in the water temperature sensor 32 (step S1-10). Accordingly, it is avoidable to determine that the ambient temperature is not in the low temperature range when it is. This reduces the possibility of falsely determining that the water temperature sensor 32 has a broken wire when actually not.

As described above, the following advantages are provided according to the first embodiment.

(1) The ECU 15 uses the intake temperature Tint detected by the intake temperature sensor 36 to determine whether the ambient temperature is in the low temperature range. Thus, the ambient temperature is detected by effectively utilizing the intake temperature sensor 36 without separately providing an ambient temperature sensor for abnormality diagnosis. Furthermore, the output value of the intake temperature sensor 36 is used only when the reference intake amount is ensured, which is when influence of heat from the engine 1 is eliminated so that the intake temperature is substantially the same as the ambient temperature. Thus, accurate detection of the ambient temperature reduces the possibility of falsely determining abnormality of the cooling device.

(2) Since the water temperature sensor 32 has resistance increasing as the temperature decreases, the ECU 15 determines that the water temperature sensor 32 has a broken wire when the ambient temperature is not in the low temperature range and the output value of the water temperature sensor 32 is greater than or equal to Vmax. Further, the ECU 15 refrains from determining presence or absence of a broken wire when the intake temperature Tint is in the low temperature range of temperatures less than the lower limit temperature Tmin. This reduces the possibility of falsely determining that a wire is broken although no wire is broken only based on a sensor output value obtained in the low temperature range. In addition, the ECU 15 uses the intake temperature Tint detected in the reference traveling state, in which the reference intake amount is ensured. Accordingly, it is avoidable to falsely determine that the ambient temperature is not in the low temperature range when actually it is. This reduces the possibility of falsely determining that a wire is broken although no wire is broken.

(3) The intake amount is sufficiently ensured when the state that the vehicle speed S is greater than or equal to the predetermined reference speed Smin has continued for time longer than or equal to the reference time Dmin. With the intake amount, the intake air absorbs most of the heat accumulated in the intake passage 50 of the engine, so that the intake temperature Tint detected by the intake temperature sensor 36 is substantially the same as the actual ambient temperature. Furthermore, the reference speed Smin and the reference time Dmin are set according to a traveling mode of the hybrid vehicle. Thus, the ECU 15 properly determines in each traveling mode that the reference intake amount is ensured to use the intake temperature Tint as the ambient temperature.

Second Embodiment

A system for cooling a vehicle-mounted power control device and a method for diagnosing abnormality of the power control device according to a second embodiment will now be described with reference to FIG. 6. Only the diagnosing method in the configuration according to the first embodiment is modified in the configuration according to the second embodiment. Thus, like reference characters designate like or corresponding parts and the parts will not be described in detail.

According to the present embodiment, the battery module 12 is subject to diagnosis in which whether it is abnormally cooled is determined. As shown in FIG. 6, when a process of abnormal cooling diagnosis is started, the ECU 15 receives input of the vehicle speed S from the vehicle speed sensor 35 (step S1-1) and sets the reference speed Smin and the reference time Dmin according to the traveling mode of the vehicle C at that moment (step S1-2). The ECU 15 then determines whether the received vehicle speed S is greater than or equal to the reference speed Smin, which indicates that the vehicle is traveling (step S1-3).

When determining the vehicle speed S is greater than or equal to the reference speed Smin (YES at step S1-3), the ECU 15 starts measuring time as the traveling duration time D, for which the state continues that the vehicle speed S is greater than or equal to the reference speed Smin (step S1-4).

The ECU 15 determines whether the traveling duration time D, of which the measurement has been started, is longer than or equal to the predetermined reference time Dmin (step S1-5). When determining that the traveling duration time D is less than the reference time Dmin (NO at step S1-5), the ECU 15 returns to step S1-3 and determines whether the vehicle speed S is greater than or equal to the reference speed Smin.

When the traveling duration time D becomes greater than or equal to the reference time Dmin (YES at step S1-5), the ECU 15 receives input of the intake temperature Tint detected by the intake temperature sensor 36 (step S1-6) and uses the intake temperature Tint as the ambient temperature.

The ECU 15 receives input of the battery temperature Tb from the battery monitoring unit 30 (step S1-11) and determines whether the intake temperature Tint is greater than the battery temperature Tb (step S1-12). When the battery is normal, the battery temperature Tb is generally greater than the ambient temperature. When determining that the intake temperature Tint is less than or equal to the battery temperature Tb (NO at step S1-12), the ECU 15 determines that the battery module 12 is not abnormally cooled (step S1-15) and moves to step S1-9.

When determining that the intake temperature Tint is greater than the battery temperature Tb (YES at step S1-12), the ECU 15 obtains the difference between the intake temperature Tint and the battery temperature Tb and determines whether the difference is greater than or equal to a predetermined value ΔT (step S1-13). When determining that the difference between the intake temperature Tint and the battery temperature Tb is less than the predetermined value ΔT (NO at step S1-13), the ECU 15 determines that the battery module 12 is not abnormally cooled (step S1-15) and moves to step S1-9.

At step S1-13, when determining that the difference between the intake temperature Tint and the battery temperature Tb is greater than or equal to the predetermined value ΔT (YES at step S1-13), the ECU 15 determines that the battery module 12 is abnormally cooled, e.g., the battery module 12 is frozen (step S1-14). In this case, the ECU 15 outputs, e.g., a code indicating abnormal cooling to another ECU and the like and moves to step S1-9. The ECU 15 determines whether to finish the diagnosis at step S1-9.

As described above, according to the second embodiment, the following advantage is provided in addition to the advantages (1) and (3) according to the first embodiment.

(4) The ECU 15 compares the battery temperature Tb input by the battery temperature sensor 31 with the intake temperature Tint input by the intake temperature sensor 36. If the battery temperature Tb is less than the intake temperature Tint and the difference between the intake temperature Tint and the battery temperature Tb is greater than or equal to the predetermined value ΔT, the ECU 15 determines that the battery module 12 is abnormally cooled. In this way, the ECU 15 can detect that the battery module 12 is abnormally cooled, e.g., the battery module 12 is frozen. Furthermore, the ECU 15 uses the intake temperature Tint detected when the vehicle C is in the reference traveling state. Accordingly, it is avoidable to falsely determine that the ambient temperature is not in the low temperature range when actually it is. This reduces the possibility of falsely determining that the battery module 12 is abnormally cooled based on the intake temperature Tint, which is greater than the actual ambient temperature.

The above illustrated embodiments may be modified in the following forms as necessary.

The subject of the diagnosis, which is the water temperature sensor 32 in the first embodiment, may be other sensors such as the battery temperature sensor 31, of which the resistance increases as the temperature decreases.

In the first embodiment, the lower limit temperature Tmin of the water temperature sensor 32 is associated with the upper limit voltage value Vmax. However, the lower limit temperature Tmin may be associated with another value around the upper limit voltage value Vmax, which may be less than or exceed the upper limit voltage value Vmax.

The system for cooling a vehicle-mounted power control device according to the first and second embodiments is mounted on a hybrid vehicle. However, a system for cooling a vehicle-mounted power control device according another embodiment may be mounted on an electric vehicle.

The structure of the hybrid vehicle is not limited to the structure as described above. The hybrid vehicle may have a structure with a type other than the parallel type such as a series type and a divided power type.

The invention claimed is:
1. A system for cooling a power control device of a hybrid vehicle including an engine and a rotating electrical machine, the system comprising:
  a cooling device for cooling the power control device;
  an electronic control device for controlling the cooling device; and
  an intake temperature sensor that is arranged in an intake passage of the engine and detects an intake temperature; wherein
  the power control device comprises an inverter connected to a rotating electrical machine and a battery connected to the inverter;
  the cooling device comprises a cooling medium circulation flow path through which a cooling medium for cooling at least the inverter circulates, a radiator for cooling the cooling medium, and a cooling medium temperature detection section that is arranged in the cooling medium circulation flow path and has resistance increasing as a temperature decrease;
  the electronic control device is configured to determine whether the vehicle is in a reference traveling state in which an intake amount to the engine is ensured to be greater than or equal to a reference intake amount,
  when determining that the vehicle is in the reference traveling state, the electronic control device is configured to determine presence or absence of abnormality in the cooling device by using an intake temperature detected by the intake temperature sensor; and
  when determining that the vehicle is not in the reference traveling state, the electronic control device is configured to refrain from determining presence or absence of abnormality in the cooling device;
  wherein the determining presence or absence of abnormality in the cooling device includes:
    the electronic control device is configured to determine whether an ambient temperature is in a low temperature range by using the intake temperature detected by the intake temperature sensor;
    the electronic control device is configured to determine whether an output value of the cooling medium temperature detection section is in an output range for a broken wire, which is a range of values output from the cooling medium temperature detection section when the cooling medium temperature detection section has a broken wire,
    when the ambient temperature is not in the low temperature range and the output value of the cooling medium temperature section is in the output range for a broken wire, the electronic control device is configured to determine that the cooling medium temperature detection section has a broken wire, and
    at least when the ambient temperature is in the low temperature range, the electronic control device is configured to refrain from determining presence or absence of a broken wire.

2. The system according to claim 1, wherein the vehicle is adapted to travel in a traveling mode selected from a plurality of traveling modes, wherein
  according to the traveling mode, the electronic control device is configured to set a reference speed and a reference traveling duration time that allow the reference intake amount to be ensured, and
  the electronic control device is configured to determine that the vehicle is in the reference traveling state when a state in which a speed of the vehicle is greater than or equal to the reference speed has continued for time longer than or equal to the reference traveling duration time.

3. A method for diagnosing an abnormality of a cooling device for cooling a power control device of a hybrid vehicle including an engine and a rotating electrical machine, wherein the vehicle includes an intake temperature sensor that is arranged in an intake passage of the engine and detects an intake temperature, wherein the power control device comprises an inverter connected to the rotating electrical machine and a battery connected to the inverter, and wherein the cooling device comprises a cooling medium circulation flow path through which a cooling medium for cooling at least the inverter circulates, a radiator for cooling the cooling medium, and a cooling medium temperature detection section that is arranged in the cooling medium circulation flow path and has resistance increasing as a temperature decrease;

the method comprising:

determining whether the vehicle is in a reference traveling state in which an intake amount to the engine is ensured to be greater than or equal to a reference intake amount;

refraining from determining presence or absence of abnormality in the cooling device when it is determined that the vehicle is not in the reference traveling state; and determining presence or absence of abnormality in the cooling device using an intake temperature detected by the intake temperature sensor as an ambient temperature when it is determined that the vehicle is in the reference traveling state;

wherein the determining presence or absence of abnormality in the cooling device includes:

determining whether the ambient temperature is in a low temperature range by using the intake temperature detected by the intake temperature sensor;

determining whether an output value of the cooling medium temperature detection section is in an output range for a broken wire, which is a range of values output from the cooling medium temperature detection section when the cooling medium temperature detection section has a broken wire;

determining that the cooling medium temperature detection section has a broken wire when the ambient temperature is not in the low temperature range and the output value of the cooling medium temperature section is in the output range for a broken wire, and refraining from determining presence or absence of a broken wire at least when the ambient temperature is in the low temperature range.

\* \* \* \* \*